(12) United States Patent
Jung et al.

(10) Patent No.: US 9,131,232 B2
(45) Date of Patent: *Sep. 8, 2015

(54) METHOD AND APPARATUS FOR ENCODING IMAGES AND METHOD AND APPARATUS FOR DECODING IMAGES

(71) Applicant: SAMSUNG ELECTRONICS CO., LTD., Suwon-si (KR)

(72) Inventors: Hae-kyung Jung, Seoul (KR); Min-su Cheon, Suwon-si (KR); Jung-hye Min, Yongin-si (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,685

(22) Filed: Jan. 27, 2015

(65) Prior Publication Data

US 2015/0139561 A1    May 21, 2015

Related U.S. Application Data

(63) Continuation of application No. 14/500,045, filed on Sep. 29, 2014, which is a continuation of application No. 14/283,752, filed on May 21, 2014, now Pat. No. 8,885,958, which is a continuation of application No. 13/386,803, filed as application No. PCT/KR2010/004868 on Jul. 23, 2010, now Pat. No. 8,768,081.

(30) Foreign Application Priority Data

Jul. 24, 2009   (KR) .................. 10-2009-0067827

(51) Int. Cl.
*G06K 9/46* (2006.01)
*H04N 19/105* (2014.01)
(Continued)

(52) U.S. Cl.
CPC ............... *H04N 19/105* (2014.11); *G06T 9/00* (2013.01); *H04N 19/00072* (2013.01);
(Continued)

(58) Field of Classification Search
CPC ............. H04N 7/50; H04N 7/34; H04N 7/32; H04N 7/26

USPC ........................................................ 382/233
See application file for complete search history.

(56) References Cited

U.S. PATENT DOCUMENTS 6,084,908 A     7/2000   Chiang et al.
2003/0202602 A1  10/2003  Apostolopoulos et al.
(Continued)

FOREIGN PATENT DOCUMENTS

CN     101147399 A     3/2008
CN     101217663 A     7/2008
(Continued)

OTHER PUBLICATIONS

International Search Report (PCT/ISA/210) issued on Apr. 7, 2011 in the International Patent Application No. PCT/KR2010/004868.

(Continued)

*Primary Examiner* — Ali Bayat
(74) *Attorney, Agent, or Firm* — Sughrue Mion, PLLC

(57) ABSTRACT

An apparatus for decoding an image includes an encoding information extractor which extracts split information indicating whether to split a coding unit of an upper depth into coding units of deeper depths and skip information indicating whether a prediction mode of a current coding unit is a skip mode, from image data and a decoding unit which determines a split structure of a maximum coding unit, according to the split information so that the maximum coding unit is hierarchically split as a depth increases and determines whether the prediction mode of the current coding unit is the skip mode according to the skip information.

1 Claim, 18 Drawing Sheets

(51) Int. Cl.

| | | |
|---|---|---|
| *G06T 9/00* | (2006.01) | |
| *H04N 19/176* | (2014.01) | |
| *H04N 19/119* | (2014.01) | |
| *H04N 19/96* | (2014.01) | |
| *H04N 19/103* | (2014.01) | |
| *H04N 19/132* | (2014.01) | |
| *H04N 19/50* | (2014.01) | |
| *H04N 19/17* | (2014.01) | |
| *H04N 19/115* | (2014.01) | |
| *H04N 19/46* | (2014.01) | |

(52) U.S. Cl.
CPC ...... *H04N 19/00569* (2013.01); *H04N 19/103* (2014.11); *H04N 19/115* (2014.11); *H04N 19/119* (2014.11); *H04N 19/132* (2014.11); *H04N 19/17* (2014.11); *H04N 19/176* (2014.11); *H04N 19/96* (2014.11); *H04N 19/46* (2014.11)

(56) References Cited

U.S. PATENT DOCUMENTS

| | | | |
|---|---|---|---|
| 2006/0146930 | A1 | 7/2006 | Kim et al. |
| 2007/0071107 | A1 | 3/2007 | Ha |
| 2009/0110077 | A1 | 4/2009 | Amano et al. |
| 2009/0285299 | A1* | 11/2009 | Chen et al. ............... 375/240.16 |
| 2010/0086051 | A1* | 4/2010 | Park et al. ............... 375/240.16 |
| 2012/0008676 | A1 | 1/2012 | Lee et al. |
| 2012/0328011 | A1* | 12/2012 | Sasai et al. ............... 375/240.12 |
| 2013/0156111 | A1 | 6/2013 | Lee et al. |

FOREIGN PATENT DOCUMENTS

| | | |
|---|---|---|
| CN | 101404774 A | 4/2009 |
| CN | 101455087 A | 6/2009 |
| JP | 2000-511366 A | 8/2000 |
| KR | 1020080088042 A1 | 11/2006 |
| KR | 10-0771640 A | 10/2007 |
| KR | 10-2008-0066522 A | 7/2008 |
| WO | 91/13514 A1 | 9/1991 |
| WO | 2008027192 A2 | 3/2008 |
| WO | 2008027192 A3 | 3/2008 |
| WO | 2008127568 A2 | 10/2008 |
| WO | 2008127568 A3 | 10/2008 |

OTHER PUBLICATIONS

Written Opinion (PCT/ISA237) issued on Apr. 7, 2011 in the International Patent Application No. PCT/KR2010/004868.

Communication, dated Jan. 6, 2014, issued by the State Intellectual Property Office of the People's Republic of China in counterpart Chinese Application No. 201080034035.7.

Communication dated May 30, 2014 issued by the Korean Patent Office in counterpart Korean Patent Application No. 10-2009-67827.

Communication dated Jun. 10, 2014 issued by the Japanese Patent Office in counterpart Japanese Patent Application No. 2012-521584. TV Society, General Multimedia MPEG, Ohom, Co., LTD., Apr. 20 1996, 1st edition, 6 pages, 2012-521584.

Communication dated Oct. 10, 2014, issued by the Korean Intellectual Property Office in counterpart Korean Application No. 10-2009-0067827.

Communication dated Oct. 28, 2014, issued by the Korean Intellectual Property Office in counterpart Korean Application No. 10-2014-0058653.

Communication dated Apr. 21, 2015, issued by the Japanese Intellectual Property Office in counterpart Japanese Application No. 2012-521584.

Jaeil Kim et al., "Enlarging MB size for high fidelity video coding beyond HD", ITU—Telecommunications Standardization Sector ST, Oct. 2008, Document: VCEG-AJ21, Total 7 pages, URL: http://wftp3.itu.int/av-arch/video-site/0810_San/VCEG-AJ21.zip.

Communication dated Apr. 28, 2015, issued by the European Patent Office in counterpart European Application No. 10802493.6.

Communication dated Jun. 25, 2015, issued by the European Patent Office in counterpart European Application No. 15161952.5.

Communication dated Jun. 10, 2015, issued by the European Patent Office in counterpart European Application No. 15161956.6.

Communication dated Jun. 10, 2015, issued by the European Patent Office in counterpart European Application No. 15161957.4.

Communication dated Jun. 10, 2015, issued by the European Patent Office in counterpart European Application No. 15161960.8.

Kim J et al., "Enlarging MB size for high fidelity video coding beyond HD", 36. VCEG Meeting Oct. 8, 2008-Oct. 10, 2008; Vidoe CodingExperts Group of ITU-T SG. 16, No. VCEG-AG21, Oct. 5, 2008, Total 6 pages, XP 030003643.

Sullivan G J et al., "Efficient Quadtree Coding of Images and Video", IEEE Transactions on Image Processing, IEEE Service Center, vol. 3, No. 3, May 1, 1994, pp. 327-331, XP 000453373.

Davies (BBC) T: "Video coding technology proposal by BBC (and Samsung)" ("BBC's Response to the Call for Proposals on Video Compression Technology"), 1. JCT-VC Meeting, Apr. 15, 2010-Apr. 23, 2010, Jointcollaborative Team on Video Coding of ISO/IEC JTC1/SC29/WG11 and ITU-TSG.16, Total 31 pages, URL: http://WFTP3.ITU.INT/AV-ARCH/JCTVC-SITE/, No. JCTVC-A125, Apr. 16, 2010, XP 30007575.

Winken (Fraunhofer HHI) M et al., "Description of Video coding technology proposal by Fraunhofer HHI", 1. JCT-VC Meeting; Apr. 15, 2010-Apr. 23, 2010, Jointcollaborative Team on Video Coding of ISO/IEC JTC1/SC29/WG11 and ITU-TSG.16, Total 44 pages, URL: http://WFTP3.ITU.INT/AV-ARCH/JCTVC-SITE/, No. JCTVC-A116, Apr. 24, 2010, XP 30007557.

* cited by examiner

FIG. 7
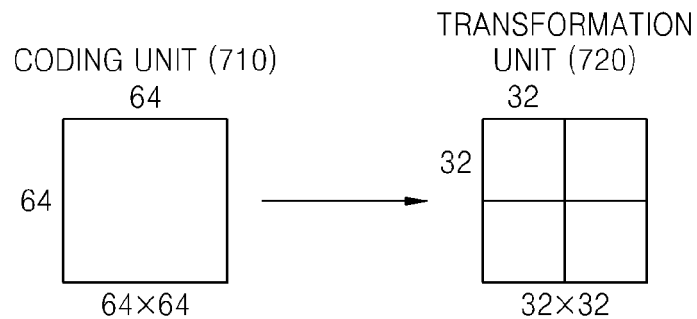
FIG. 8
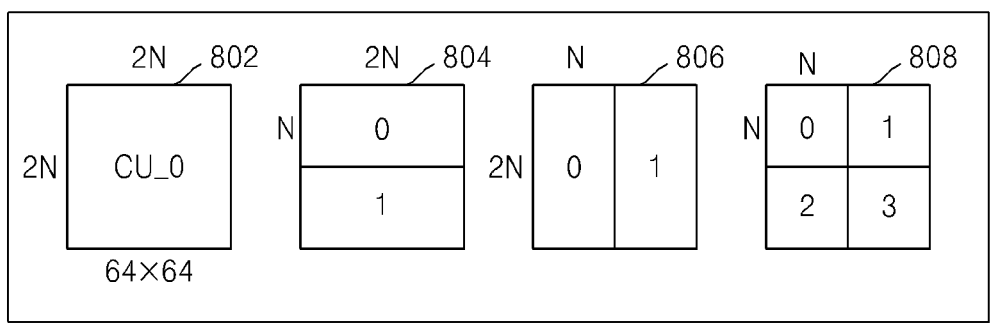
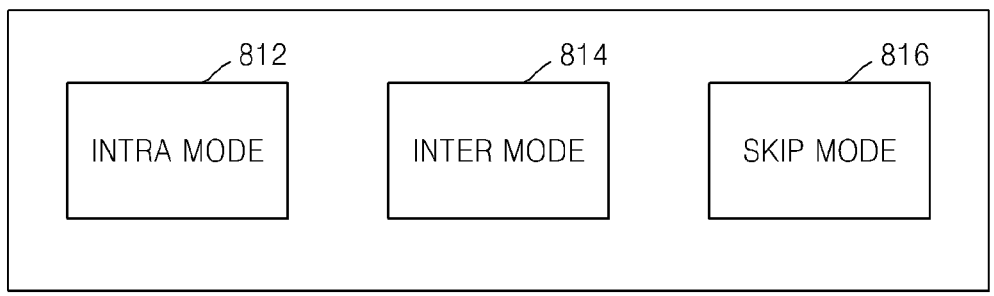
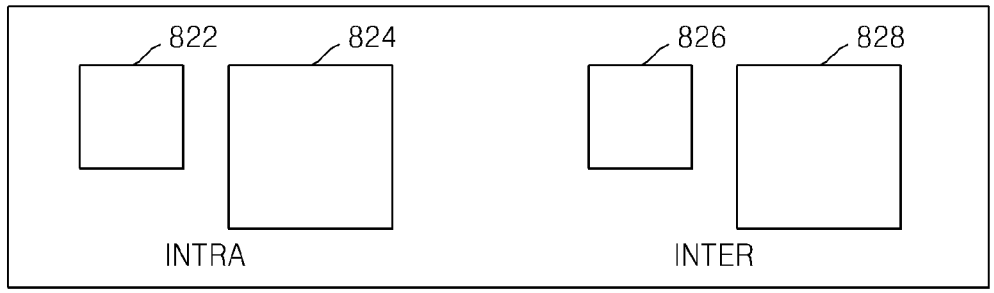

CODING UNIT (1010)

PREDICTION UNIT (1060)

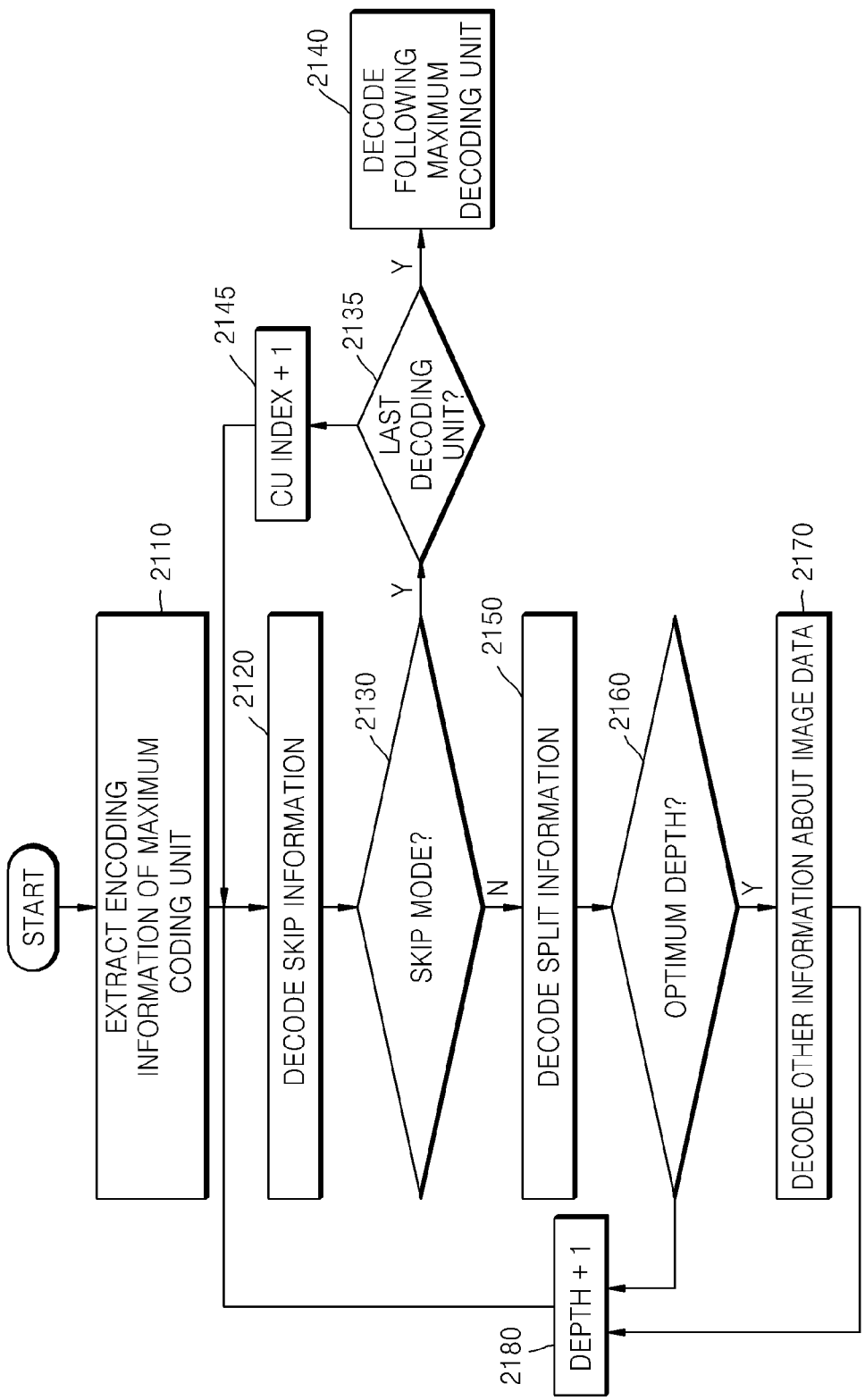

METHOD AND APPARATUS FOR ENCODING IMAGES AND METHOD AND APPARATUS FOR DECODING IMAGES

CROSS-REFERENCE TO RELATED APPLICATIONS

This is a continuation application of U.S. patent application Ser. No. 14/500,045, which is a continuation application of U.S. patent application Ser. No. 14/283,752, which is a continuation application of U.S. patent application Ser. No. 13/386,803, filed on Feb. 13, 2012, in the U.S. Patent and Trademark Office, which is a National Stage of International Application No. PCT/KR2010/004868, filed Jul. 23, 2010, which claims priority from Korean Patent Application No. 10-2009-0067827, filed on Jul. 24, 2009, in the Korean Intellectual Property Office, the disclosures of which are incorporated herein by reference in their entireties.

TECHNICAL FIELD

The inventive concept relates to encoding and decoding an image.

RELATED ART

Examples of an image prediction encoding method include an intra prediction method and an inter prediction method. The intra prediction method is a prediction method based on a correlation of adjacent pixels in a single frame. The inter prediction method is a method of predicting a region similar to data encoded from an adjacent frame via motion prediction and compensation.

Generally, a motion vector of a block has a close correlation with a motion vector of an adjacent block. Thus, a bit amount generated during encoding may be reduced by predicting a motion vector of a current block from an adjacent block, and encoding only a differential motion vector between the motion vector of the current block and a prediction motion vector.

A skip mode is a mode selected when a motion vector of a macroblock is identical to a prediction motion vector predicted by using a motion vector of an adjacent block and when a prediction error is sufficiently small. When the skip mode is selected as a prediction mode of a macroblock, an encoder only transmits information about the skip mode of the macroblock and does not transmit residual data. A decoder may restore the macroblock by performing motion compensation on the macroblock encoded in the skip mode by using a prediction motion vector predicted from a block adjacent to the macroblock.

Technical Solution

Exemplary embodiments provide methods and apparatuses for encoding and decoding an image, which efficiently transmit information about split structures of an image encoded based on a hierarchical coding unit in various sizes, and information about a skip mode of each coding unit.

Advantageous Effects

Exemplary embodiments may provide methods and apparatuses for encoding and decoding an image, which efficiently transmit information about split structures of an image encoded based on a hierarchical coding unit in various sizes, and information about a skip mode of each coding unit

DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 23 is a flowchart illustrating a process of splitting a maximum decoding unit and a process of decoding skip information, according to a method of decoding an image, according to another exemplary embodiment.

SUMMARY

Figure 1:
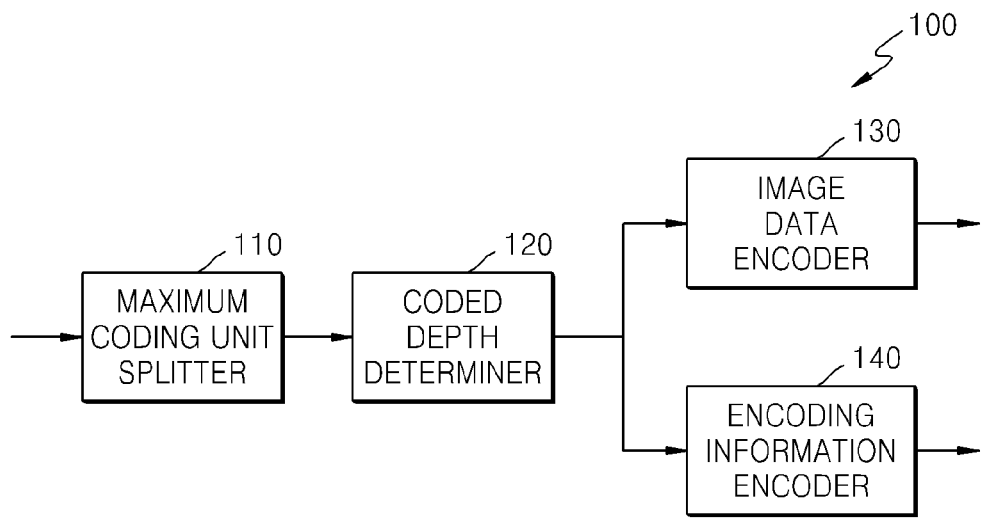
FIG. 1 is a block diagram of an apparatus for encoding an image, according to an exemplary embodiment.

According to an aspect of an exemplary embodiment, there is provided a method of encoding an image, the method comprising: splitting a current picture into at least one maximum coding unit; determining a split structure of the at least one maximum coding unit and a prediction mode of each coding unit by encoding image data of the at least one maximum coding unit based on deeper coding units according to depths, which are hierarchically split as a depth deepens; setting split information about a split of a coding unit of an upper depth including each coding unit, according to each coding unit; setting skip information indicating whether the determined prediction mode is a skip mode, according to each coding unit; and encoding the split information and skip information, which are set according to each coding unit.

According to another aspect of an exemplary embodiment, there is provided a method of encoding an image, the method comprising: splitting a current picture into at least one maximum coding unit; determining a split structure of the at least one maximum coding unit and a prediction mode of each coding unit by encoding image data of the at least one maximum coding unit based on deeper coding units according to depths, which are hierarchically split as a depth deepens; setting skip information indicating whether the prediction mode of each coding unit and a prediction mode of an upper depth including each coding unit are each a skip mode, according to each coding unit; setting split information about a split of a coding unit of an upper depth including each coding unit, according to each coding unit; and encoding the split information and skip information, which are set according to each coding unit.

According to another aspect of an exemplary embodiment, there is provided A method of decoding an image, the method comprising: extracting split information about a split of decoding units of upper depths including a current decoding unit to be decoded, from image data encoded according to maximum coding units based on deeper coding units according to depths, which are hierarchically split as a depth deepens; extracting skip information indicating whether a prediction mode of the current decoding unit is a skip mode, from the image data; determining split structures of a maximum decoding unit including the current decoding unit, according to the split information; determining whether the prediction mode of the current decoding unit is a skip mode according to the skip information.

According to another aspect of an exemplary embodiment, there is provided a method of decoding an image, the method comprising: extracting skip information indicating whether prediction modes of a current decoding unit to be decoded and decoding units of upper depths including the current decoding unit are each a skip mode, from image data encoded according to maximum coding units based on deeper coding units according to depths, which are hierarchically split as a depth deepens; extracting split information about a split of the decoding units of upper depths including the current decoding unit; determining whether the prediction modes of the current decoding unit and the decoding units of upper depths are each a skip mode according to the extracted skip information; and determining split structures of a maximum decoding unit including the current decoding unit, according to the split information.

According to another aspect of an exemplary embodiment, there is provided an apparatus for encoding an image, the apparatus comprising: a maximum coding unit splitter for splitting a current picture into at least one maximum coding unit; a coded depth determiner for determining a split structure of the at least one maximum coding unit and a prediction mode of each coding unit by encoding image data of the at least one maximum coding unit based on deeper coding units according to depths, which are hierarchically split as a depth deepens; and an encoding information coding unit for setting split information about a split of a coding unit of an upper depth including each coding unit, according to each coding unit and skip information indicating whether the determined prediction mode is a skip mode, according to each coding unit, and encoding the set split information and skip information.

According to another aspect of an exemplary embodiment, there is provided An apparatus for encoding an image, the apparatus comprising: a maximum coding unit splitter for splitting a current picture into at least one maximum coding unit; a coded depth determiner for determining a split structure of the at least one maximum coding unit and a prediction mode of each coding unit by encoding image data of the at least one maximum coding unit based on deeper coding units according to depths, which are hierarchically split as a depth deepens; and an encoding information coding unit for setting skip information indicating whether the prediction mode of each coding unit and a prediction mode of an upper depth including each coding unit are each a skip mode and split information about a split of a coding unit of an upper depth including each coding unit, according to each coding unit, and encoding the set split information and skip information.

According to another aspect of an exemplary embodiment, there is provided An apparatus for decoding an image, the apparatus comprising: an encoding information extractor for extracting split information about a split of decoding units of upper depths including a current decoding unit to be decoded and skip information indicating whether a prediction mode of the current decoding unit is a skip mode, from image data encoded according to maximum coding units based on deeper coding units according to depths, which are hierarchically split as a depth deepens; and a decoding unit for determining split structures of a maximum decoding unit including the current decoding unit, according to the split information, and determining whether the prediction mode of the current decoding unit is a skip mode according to the skip information.

According to another aspect of an exemplary embodiment, there is provided an apparatus for decoding an image, the apparatus comprising: an encoding information extractor for extracting skip information indicating whether prediction modes of a current decoding unit to be decoded and decoding units of upper depths including the current decoding unit are each a skip mode and split information about a split of the decoding units of upper depths including the current decoding unit from image data encoded according to maximum coding units based on deeper coding units according to depths, which are hierarchically split as a depth deepens; and a decoding unit for determining whether the prediction modes of the current decoding unit and the decoding units of upper depths are each a skip mode according to the extracted skip information, and determining split structures of a maximum decoding unit including the current decoding unit, according to the split information.

Detailed Description of the Exemplary Embodiments

Hereinafter, the exemplary embodiments will be described more fully with reference to the accompanying drawings, in which exemplary embodiments of the inventive concept are shown.

FIG. 1 is a block diagram of an image encoding apparatus 100, according to an exemplary embodiment.

Referring to FIG. 1, the image encoding apparatus 100 according to the current embodiment includes a maximum coding unit splitter 110, a coded depth determiner 120, an image data coding unit 130, and encoding information coding unit 140.

The maximum coding unit splitter 110 may split a current picture or current slice based on a maximum coding unit. The current picture or current slice is split into at least one maximum coding unit. The maximum coding unit according to an exemplary embodiment may be a data unit having a size of 32×32, 64×64, 128×128, 256×256, etc., wherein a structure of the data unit is a square having a width and length in squares of 2, the width and length being larger than 8. The image data may be output to the coded depth determiner 120 according to the at least one maximum coding unit.

A coding unit according to an exemplary embodiment may be expressed by a maximum coding unit and a depth. The maximum coding unit denotes a coding unit having the largest size from among coding units of a current picture, and the depth denotes a number of times the coding unit is spatially split from the maximum coding unit. As the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined. Such a maximum coding unit and maximum depth may be set in a picture or slice unit. In other words, different maximum coding units and different maximum depths may be set for each picture or slice, and a size of a minimum coding unit included in the maximum coding unit may be variously set according to the maximum depth. As such, by variously setting the maximum coding unit and the maximum depth according to pictures or slices, encoding efficiency may be improved by encoding an image of a flat region by using the maximum coding unit, and compression efficiency of an image may be improved by encoding an image having high complexity by using a coding unit having a smaller size than the maximum coding unit.

The coding unit determiner 120 determines depths according to maximum coding units. The depth may be determined based on a rate-distortion (R-D) cost calculation. In detail, the coded depth determiner 120 encodes at least one split region obtained by splitting a region of the maximum coding unit according to depths, and determines a depth to output a finally encoded image data according to the at least one split region. In other words, the coded depth determiner 120 determines a coded depth by encoding the image data in the deeper coding units according to depths, according to the maximum coding unit of the current picture, and selecting a depth having the least encoding error. The determined maximum depth is output to the encoding information coding unit 140, and the image data according to maximum coding units is output to the image data coding unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, coding units corresponding to a same depth in one maximum coding unit may be split to the coding units of a lower depth by measuring an encoding error of the image data, separately. Accordingly, even when image data is included in one maximum coding unit, the encoding errors may differ according to regions in the one maximum coding unit, and thus the coded depths may differ according to regions in the image data. In other words, the maximum coding unit may be split into coding units having different sizes according to different depths. Thus, one or more coded depths may be determined in one maximum coding unit, and the image data of the maximum coding unit may be split according to coding units of at least one coded depth.

Accordingly, the coding unit determiner 120 according to an exemplary embodiment may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splits from a maximum coding unit to a minimum coding unit. A first maximum depth according to an exemplary embodiment may denote the total number of splits from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation of the maximum coding unit are also performed based on the deeper coding units according to a depth equal to or depths less than the maximum depth, according to the maximum coding unit. In other words, the image encoding apparatus 100 may variously select a size or structure of a data unit for encoding the image data. In order to encode the image data, operations, such as prediction, transformation, and entropy encoding, are performed, and at this time, the same data unit may be used for all operations or different data units may be used for each operation.

For example, the image encoding apparatus 100 may select a data unit that is different from the coding unit, so as to predict the coding unit. In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that becomes a basis unit for prediction will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary structures.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. If the coding unit includes a plurality of prediction units, the encoding is independently performed on each prediction unit in the coding unit, thereby selecting a prediction mode having a least encoding error.

Alternatively, the image encoding apparatus 100 may transform the image data based on a data unit having a different size from the coding unit. In order to transform the coding unit, transformation may be performed based on a data unit having a size smaller than or equal to the coding unit. Hereinafter, a data unit used as a base of the transformation will now be referred to as a "transformation unit". Similarly to the coding unit, the transformation unit in the coding unit may be recursively split into smaller sized transformation units, and thus, residual data in the coding unit may be divided according to the transformation having the tree structure according to transformation depths.

A transformation depth according to an exemplary embodiment indicating the number of splits to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. In other words, the transformation unit having a tree structure according to transformation depths may be set. Encoding information according to coded depths requires not only information about the coded depth, but also about information related to prediction encoding and transformation. Accordingly, the coded depth determiner 120 not only determines a coded depth having a least encoding error, but also determines a partition type to split the prediction unit to partitions, a prediction mode according to prediction units, and a size of a transformation unit for transformation.

The coded depth determiner 120 may measure an encoding error of deeper coding units according to depths by using Rate-Distortion Optimization based on Lagrangian multipliers, so as to determine a spilt structure of the maximum coding unit having an optimum encoding error. In other words, the coded depth determiner 120 may determine structures of the coding units to be split from the maximum coding unit, wherein the sizes of the coding units are different according to depths.

The image data coding unit 130 outputs the image data of the maximum coding unit, which is encoded based on the at least one coded depth determined by the coded depth determiner 120, in bitstreams. Since the encoding is already performed by the coded depth determiner 120 to measure the minimum encoding error, an encoded data stream may be output by using the minimum encoding error.

The encoding information coding unit 140 outputs information about the encoding mode according to coded depth, which is encoded based on the at least one coded depth determined by the coded depth determiner 120, in bitstreams. The information about the encoding mode according to coded depth may include information about the coded depth, about partition type to split the prediction unit to partitions, the prediction mode according to prediction units, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the encoding information coding unit 140 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit. For example, the encoding information output through the encoding information coding unit 140 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the image encoding apparatus 100, the deeper coding unit may be a coding unit obtained by dividing a height or width of a coding unit of an upper depth, which is one layer above, by two. In other words, when the size of the coding unit of the current depth k is 2N×2N, the size of the coding unit of the lower depth k+1 is N×N. Thus, the coding unit of the current depth having the size of 2N×2N may include maximum 4 of the coding unit of the lower depth of N×N.

Accordingly, the image encoding apparatus 100 according to an exemplary embodiment may form the coding units having the tree structure by determining coding units having an optimum structure and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

If an image having high resolution or large data amount is encoded in a conventional macroblock having a size of 16×16, a number of macroblocks per picture excessively increases. Accordingly, a number of pieces of compressed information generated for each macroblock increases, and thus it is difficult to transmit the compressed information and data compression efficiency decreases. However, by using the image encoding apparatus 100, image compression efficiency may be increased since a coding unit is adjusted while considering characteristics of an image while increasing a maximum size of a coding unit while considering a size of the image.

Figure 2:
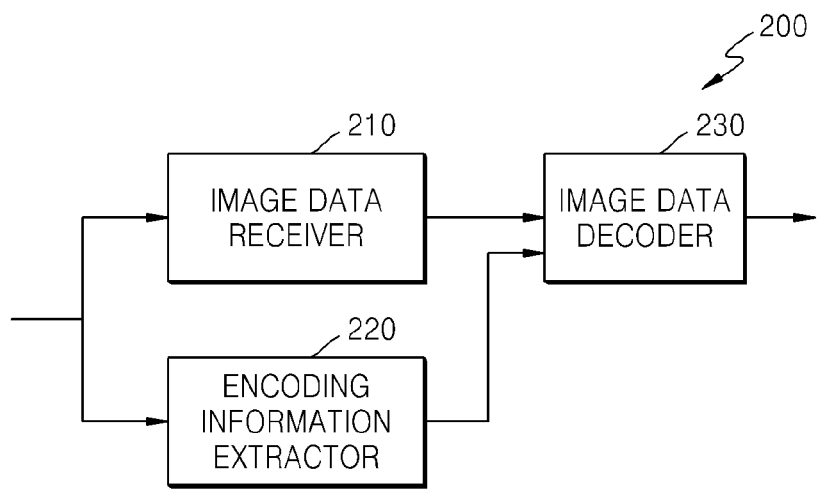
FIG. 2 is a block diagram of an apparatus for decoding an image, according to an exemplary embodiment.

FIG. 2 is a block diagram of an image decoding apparatus 200, according to an exemplary embodiment.

Referring to FIG. 2, the image decoding apparatus 200 includes an image data obtainer 210, an encoding information extractor 220, and an image data decoding unit 230. Definitions of various terms, such as a coding unit, a depth, a prediction unit, a transformation unit, and information about various encoding modes, for various operations of the image decoding apparatus 200 are identical to those described with reference to FIG. 1 and the image encoding apparatus 100. The image data obtainer 210 receives and parses a bitstream received by the image decoding apparatus 200 to obtain image data according to maximum coding units, and outputs the image data to the image data decoding unit 230. The image data obtainer 210 may extract information about the maximum coding unit of a current picture or slice from a header about the current picture or slice. The image decoding apparatus 200 according to an exemplary embodiment decodes the image data according to maximum coding units.

Also, the encoding information extractor 220 extracts information about a coded depth and an encoding mode for the coding units having a tree structure according to each maximum coding unit, by parsing the bitstream received by the image decoding apparatus 200. The extracted information about the coded depth and the encoding mode is output to the image data decoding unit 230.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the encoding information extractor 220 is information about a coded depth and an encoding mode determined to generate a minimum encoding error when an encoder, such as the image encoding apparatus 100, repeatedly performs encoding for each deeper coding unit according to depths according to each maximum coding unit. Accordingly, the image decoding apparatus 200 may restore an image by decoding the image data according to an encoding mode that generates the minimum encoding error.

Since encoding information about the coded depth and the encoding mode may be assigned to a predetermined data unit from among a corresponding coding unit, a prediction unit, and a minimum unit, the encoding information extractor 220 may extract the information about the coded depth and the encoding mode according to the predetermined data units. If the information about the coded depth and the encoding mode of the corresponding maximum coding unit is recorded according to the predetermined data units, the predetermined data units to which the same information about the coded depth and the encoding mode is assigned may be inferred to be the data units included in the same maximum coding unit.

The image data decoding unit 230 restores the current picture by decoding the image data in each maximum coding unit based on the information about the coded depth and the encoding mode according to the maximum coding units extracted by the encoding information extractor 220. In other words, the image data decoding unit 230 may decode the encoded image data based on the extracted information about the partition type, the prediction mode, and the transformation unit for each coding unit from among the coding units having the tree structure included in each maximum coding unit. A decoding process may include an intra prediction process, a motion prediction process including motion compensation, and an inverse transformation process.

The image data decoding unit 230 may perform intra prediction or motion compensation according to a partition and a prediction mode of each coding unit, based on the information about the partition type and the prediction mode of the prediction unit of the coding unit according to coded depths. Also, the image data decoding unit 230 may perform inverse transformation according to each transformation unit in the coding unit, based on the information about the size of the transformation unit of the coding unit according to coded depths, so as to perform the inverse transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoding unit 230 may decode a coding unit of the current depth of the encoded data in the current maximum coding unit by using the information about the partition type of the prediction unit, the prediction mode, and the size of the transformation unit. In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoding unit 230 in the same encoding mode.

The image decoding apparatus 200 may obtain information about a coding unit that generates the minimum encoding error when encoding is recursively performed for each maximum coding unit, and may use the information to decode the current picture. In other words, the coding units having the tree structure determined to be the optimum coding units in each maximum coding unit may be decoded. Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 3:
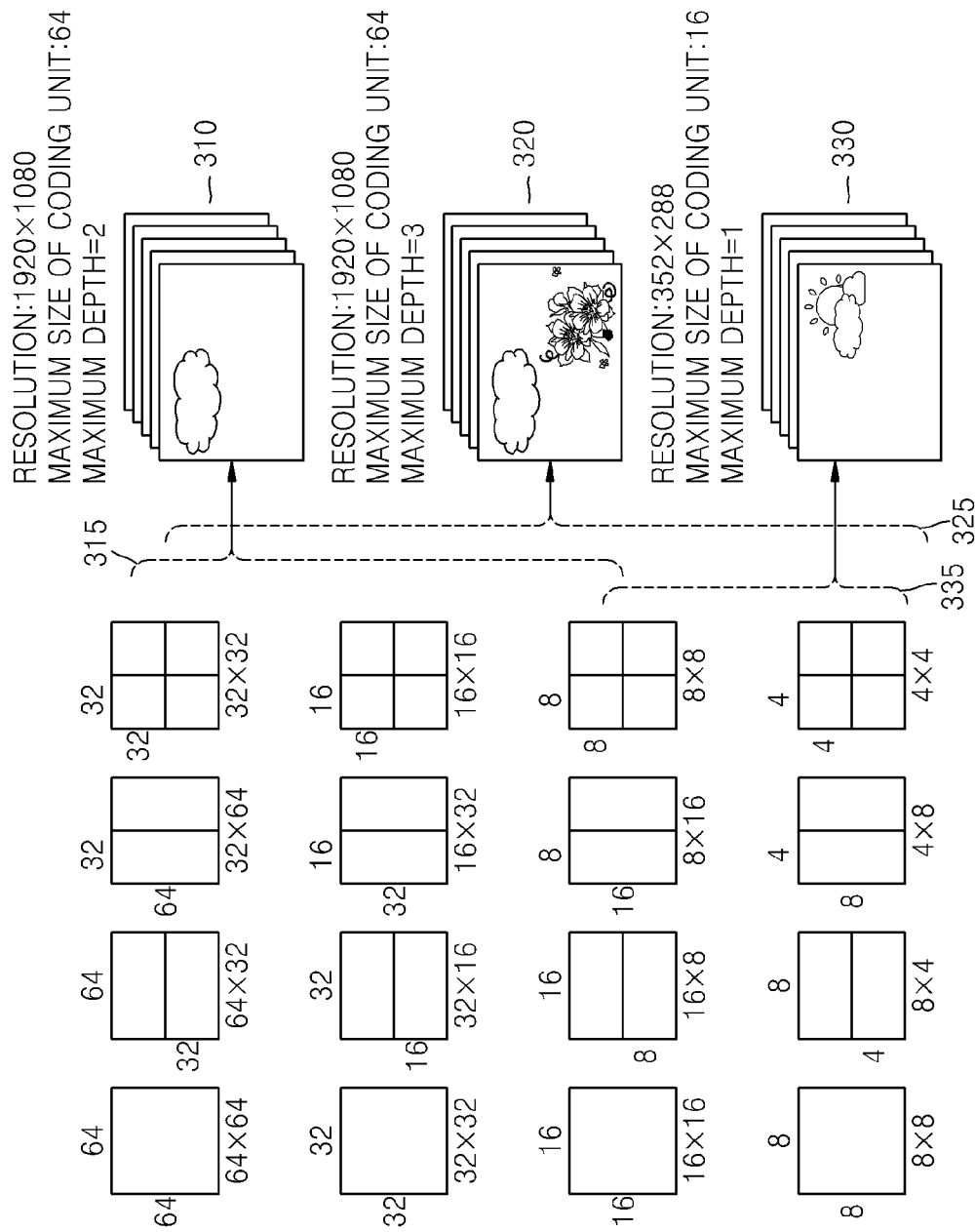
FIG. 3 is a diagram for describing a concept of hierarchical coding units according to an exemplary embodiment.

FIG. 3 is a diagram for describing a concept of hierarchical coding units according to an exemplary embodiment.

Referring to FIG. 3, a size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
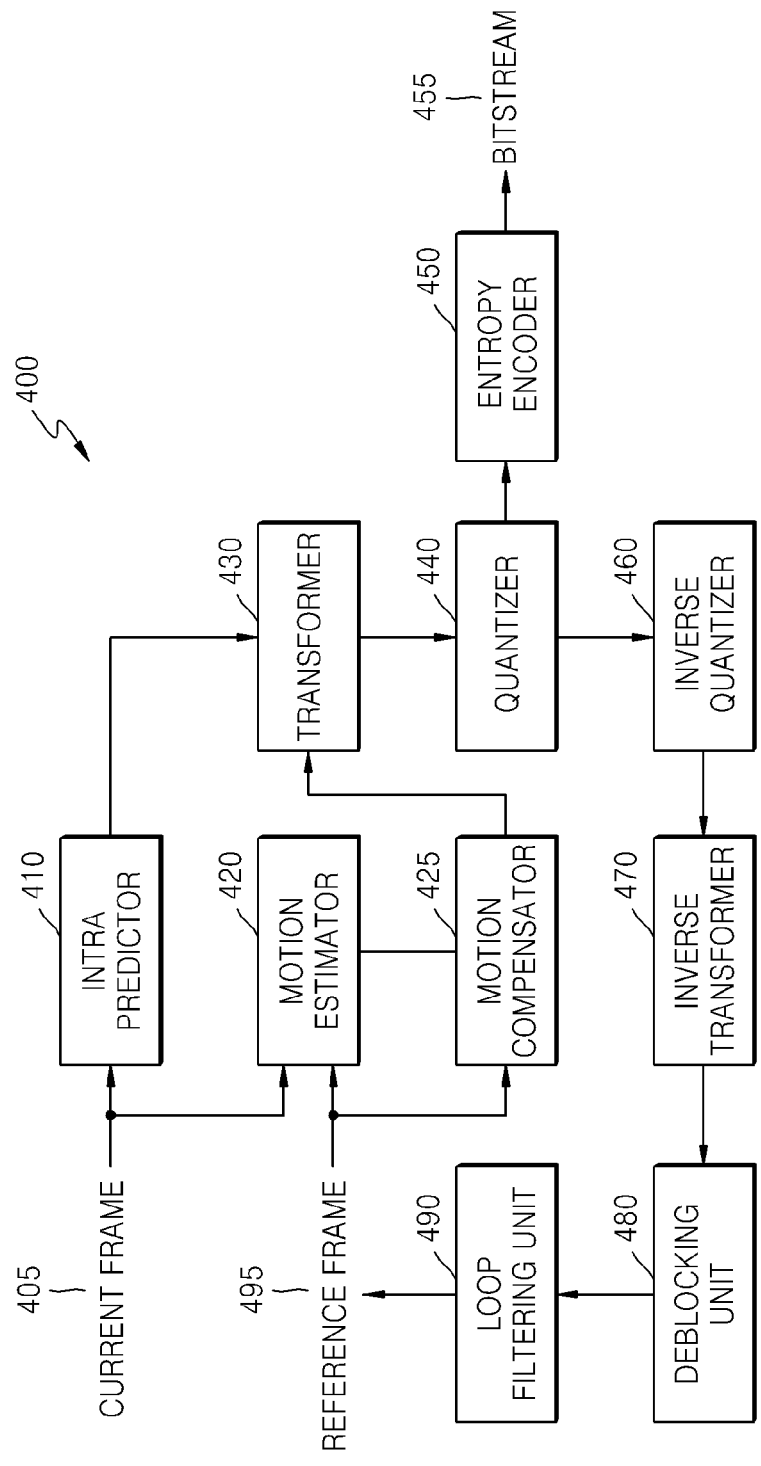
FIG. 4 is a block diagram of an image encoder based on coding units according to an exemplary embodiment.

FIG. 4 is a block diagram of an image encoder 400 based on coding units according to an exemplary embodiment.

The image encoder 400 according to an exemplary embodiment performs operations of the coded depth determiner 120 of the image encoding apparatus 100 to encode image data.

Referring to FIG. 4, an intra predictor 410 performs intra prediction on prediction units in an intra mode, from among a current frame 405, and a motion estimator 420 and a motion compensator 425 performs inter estimation and motion compensation on prediction units in an inter mode by using the current frame 405, and a reference frame 495.

Residual values are generated based on the prediction units output from the intra predictor 410, the motion estimator 420, and the motion compensator 425, and the generated residual values are output as a quantized transformation coefficient through a transformer 430 and a quantizer 440.

The quantized transformation coefficient is restored as the residual values through an inverse quantizer 460 and an inverse transformer 470, and the restored residual values are output as the reference frame 495 after being post-processed through a deblocking unit 480 and a loop filtering unit 490. The quantized transformation coefficient may be output as a bitstream 455 through an entropy encoder 450.

In order to perform encoding according to an image encoding method according to an exemplary embodiment, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform image encoding operations based on each coding unit from among coding units having a tree structure while considering the maximum depth of each maximum coding unit. Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
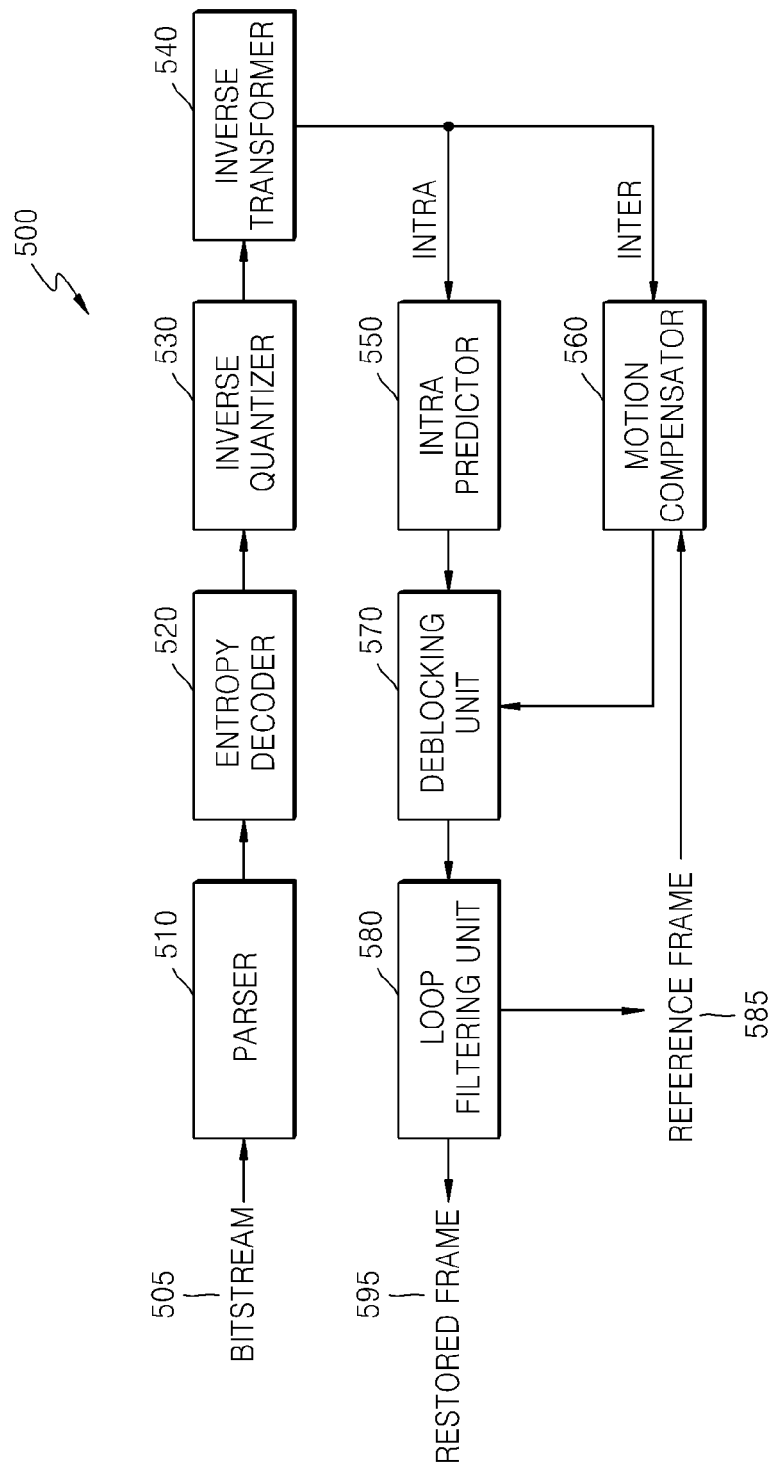
FIG. 5 is a block diagram of an image decoder based on coding units according to an exemplary embodiment.

FIG. 5 is a block diagram of an image decoder 500 based on coding units according to an exemplary embodiment.

Referring to FIG. 5, a parser 510 parses encoded image data to be decoded and information about encoding required for decoding from a bitstream 505. The encoded image data is output as inverse quantized data through an entropy decoder 520 and an inverse quantizer 530, and the inverse quantized data is restored to residual values through an inverse transformer 540. The residual values are restored according to coding units by being added to an intra prediction result of an intra predictor 550 or a motion compensation result of a motion compensator 560. The restored coding units pass through a deblocking unit 570 and a loop filtering unit 580 to be used to predict a following coding unit or picture to output a restored frame 595 or a reference frame 585.

In order to perform decoding according to an image decoding method according to an exemplary embodiment, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform image decoding processes based on the maximum coding unit, the coding unit according to depths, the prediction unit, and the transformation unit. Specifically, the intra prediction 550 and the motion compensator 560 determine the prediction unit and the prediction mode of the coding unit by considering the maximum size and depth of the coding unit, and the inverse transformer 540 determines the size of transformation unit by considering the maximum size and depth of the coding unit.

Figure 6:
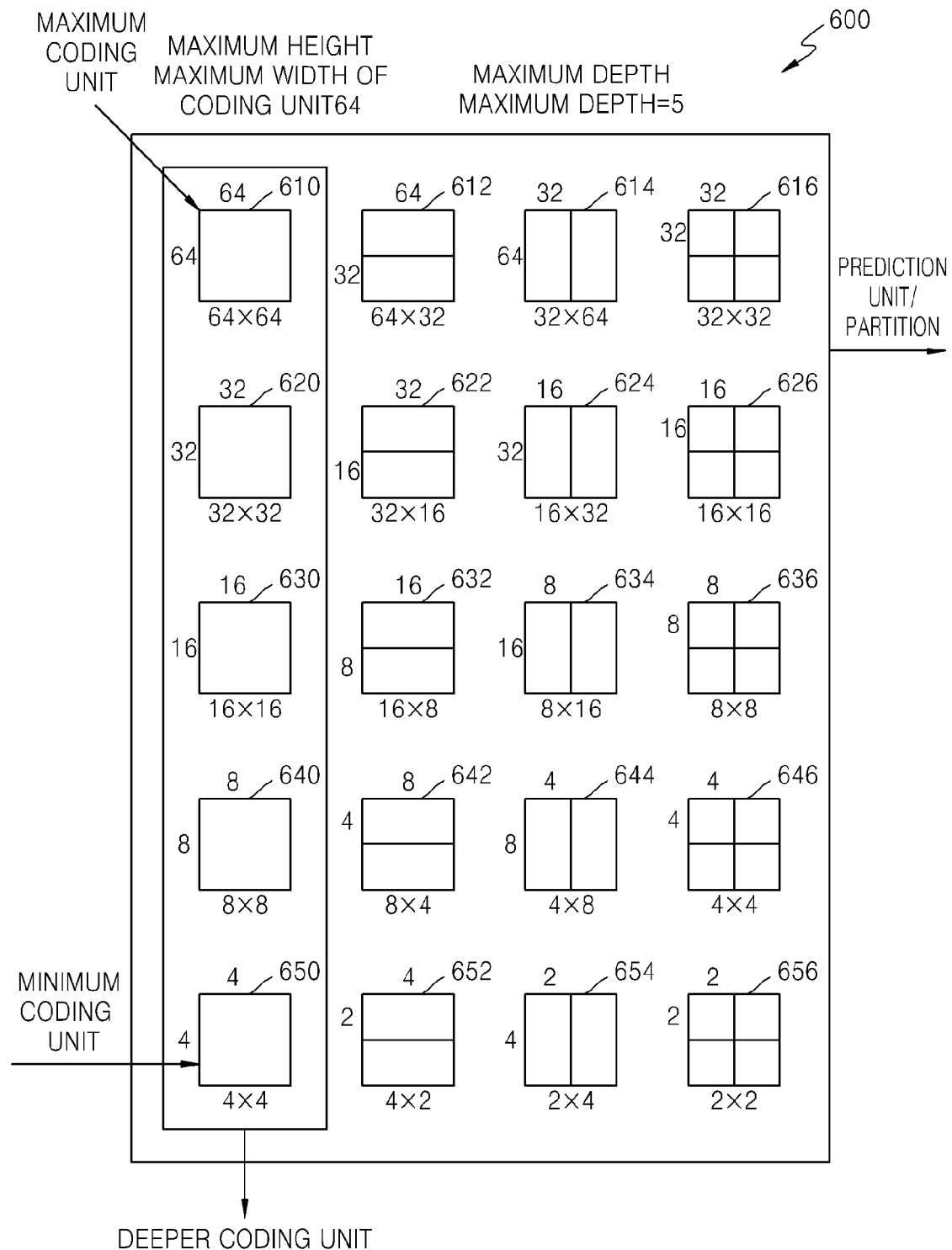
FIG. 6 is a diagram illustrating deeper coding units according to depths, and prediction units according to an exemplary embodiment.

FIG. 6 is a diagram illustrating deeper coding units according to depths, and prediction units according to an exemplary embodiment.

The image encoding apparatus 100 and the image decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

A coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

Also, referring to FIG. 6, the prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

A prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

A prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 may be split into partitions included in the coding unit 650, i.e. a partition 652 having a size of 4×2 included in the coding unit 650, partitions 654 having a size of 2×4, and partitions 656 having a size of 2×2.

In order to determine the at least one coded depth of the coding units constituting the maximum coding unit 610, the coded depth determiner 120 of the image encoding apparatus 100 performs encoding for coding units corresponding to each depth included in the maximum coding unit 610.

A number of deeper coding units according to depths including data in the same range and the same size increases as the depth of coding unit increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The image encoding apparatus 100 or the image decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit. For example, if a size of the coding unit 710 is 64×64, transformation may be performed by using the transformation units 720 having a size of 32×32. Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The image data coding unit 130 of the image encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 indicates information about a structure of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a size of a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
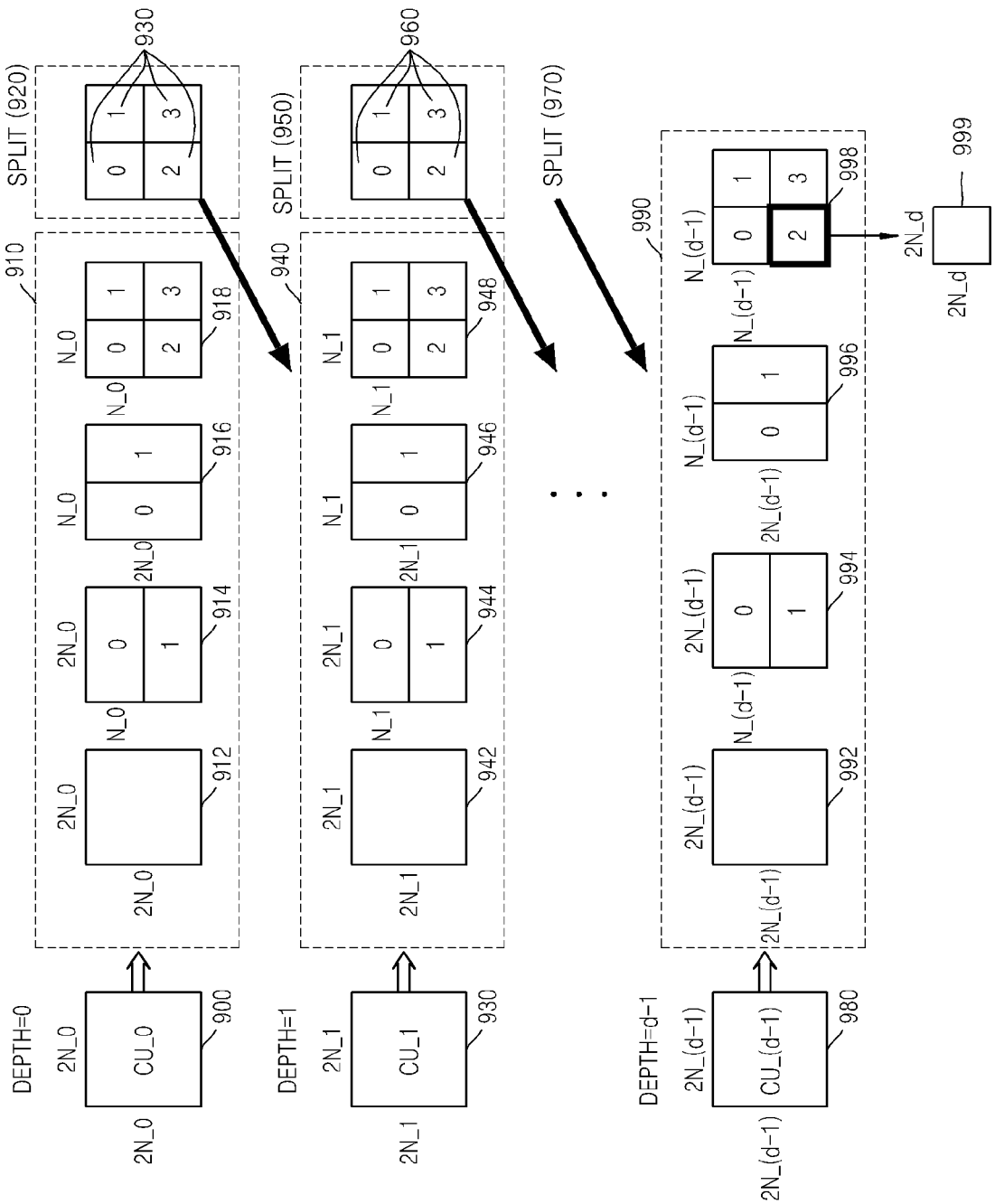
FIG. 9 is a diagram of deeper coding units according to depths, according to an exemplary embodiment.

The encoding information extractor 220 of the image decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined structure, and partitions having a geometrical structure.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error. Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the image encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The encoding information extractor 220 of the image decoding apparatus 200 according to an exemplary embodiment may extract and use the information about the coded depth and the prediction unit of the coding unit 900 to decode the coding unit 900. The image decoding apparatus 200 according to an exemplary embodiment may determine a depth, in which split information is 0, as a coded depth by using split information according to depths, and use information about an encoding mode of the corresponding depth for decoding.

Figure 10:
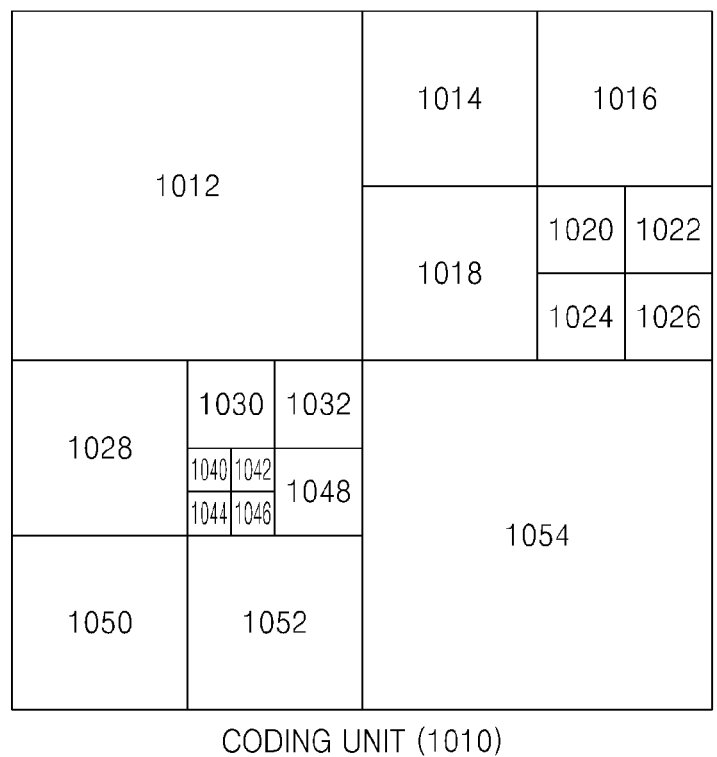
FIGS. 10 through 12 are diagrams for describing a relationship between coding units, prediction units, and transformation units, according to an exemplary embodiment.
Figure 11:
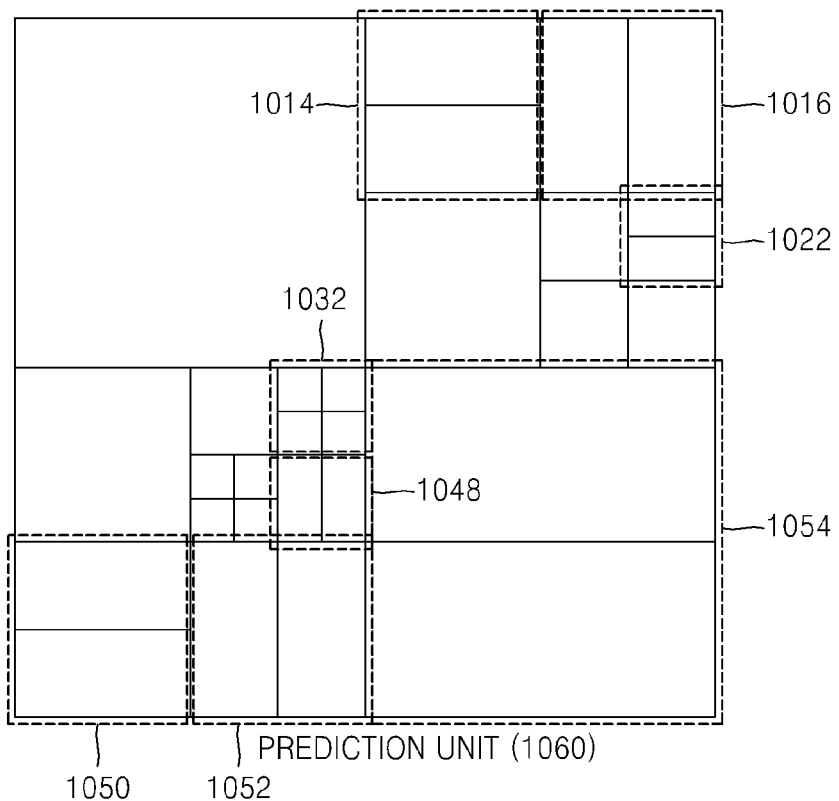
Figure 12:
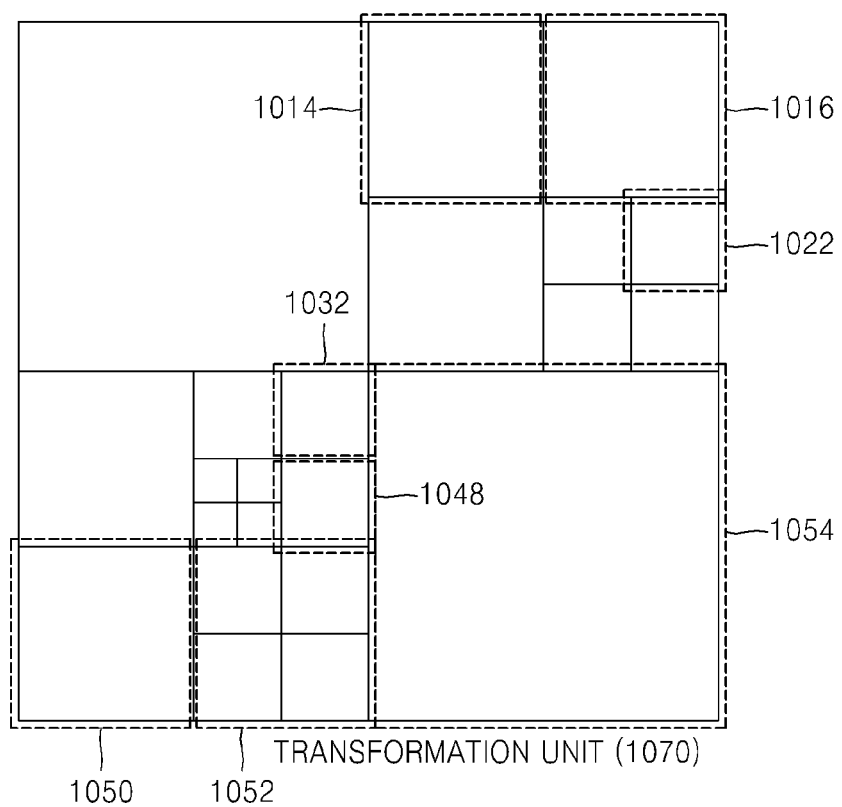

FIGS. 10 through 12 are diagrams for describing a relationship between coding units 1010, prediction units 1060, and transformation units 1070, according to an exemplary embodiment.

The coding units 1010 are coding units corresponding to coded depths determined by the image encoding apparatus 100, in a maximum coding unit. The prediction units 1060 are partitions of prediction units of each of the coding units 1010, and the transformation units 1070 are transformation units of each of the coding units 1010.

When a depth of the maximum coding unit is 0, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding units 1052 and 1054 in the transformation units 1070 in a data unit that is smaller than the coding unit 1052 and 1054. Also, the coding units 1014, 1016, 1022, 1032, 1048, 1050, 1052, and 1054 in the transformation units 1070 are different from those in the prediction units 1060 in terms of sizes and structures. In other words, the video encoding and decoding apparatuses 100 and 200 may perform prediction, transformation, and inverse transformation on the same coding unit based on individual data unit. Accordingly, encoding is recursively performed on each of coding units to determine an optimum coding unit, and thus coding units having a recursive tree structure may be obtained.

Encoding information may include split information about a coding unit, information about a partition type, information about a prediction mode, and information about a size of a transformation unit. Table 1 shows the encoding information that may be set by the image encoding and decoding apparatuses 100 and 200.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The image data coding unit 130 of the image encoding apparatus 100 according to an exemplary embodiment may output the encoding information about the coding units having a tree structure, and the encoding information extractor 220 of the image decoding apparatus 200 according to an exemplary embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred for predicting the current coding unit.

Figure 13:
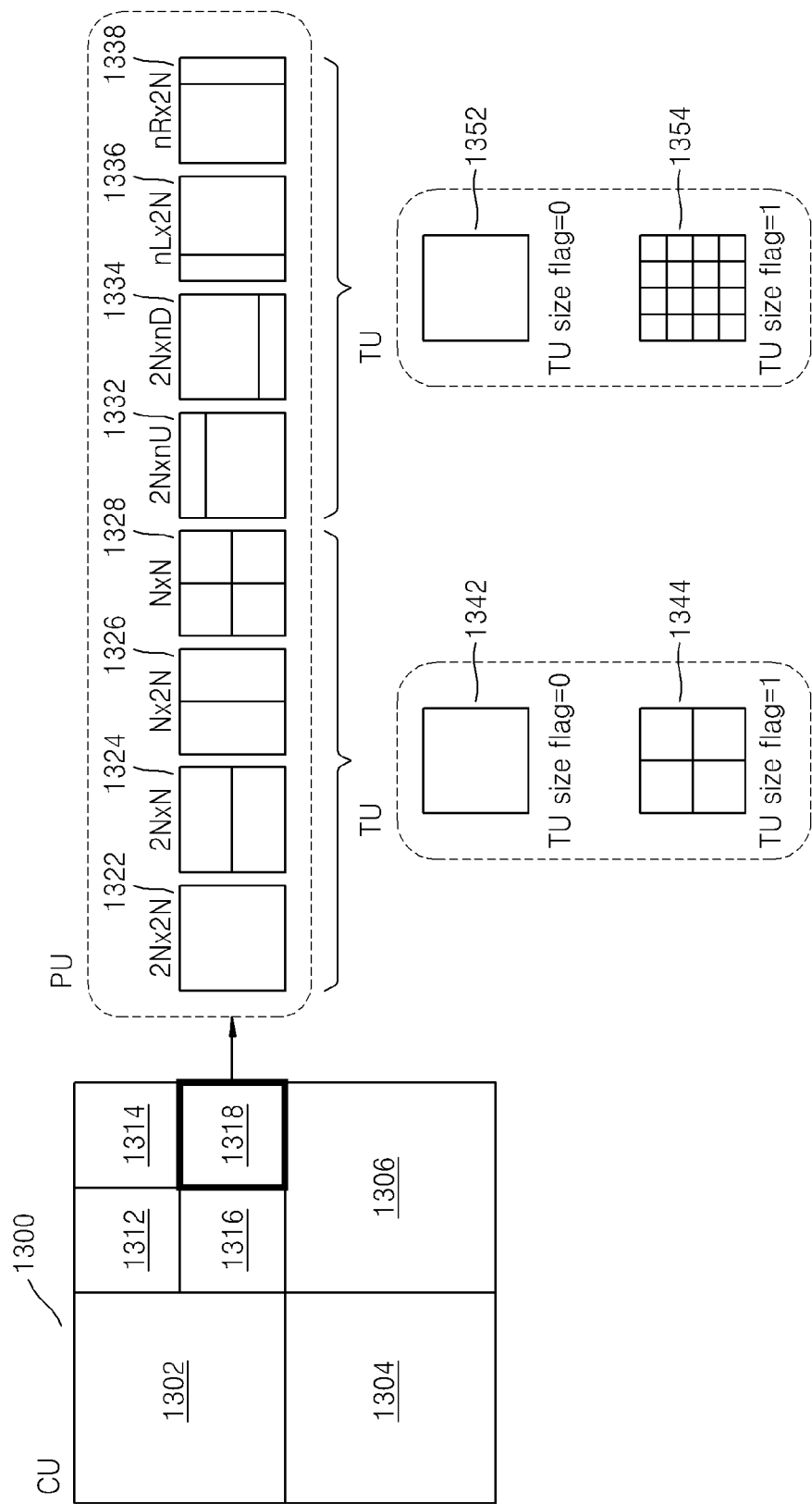
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, a method of hierarchically encoding split information (split flag) indicating split structures of a maximum coding unit encoded based on the coding units according to depths, and skip information indicating whether a prediction mode of each coding unit included in a maximum coding unit is a skip mode, according to an exemplary embodiment, will be described in detail. In the following description, a coding unit is a term used during image encoding and a decoding unit is a term for the coding unit in terms of image decoding. In other words, the coding unit and the decoding unit are different only in that the coding unit is used in the encoding process and the decoding unit is used in the decoding process. For the consistency of terms, except for a particular case, the coding unit and the decoding unit are referred to as a coding unit in both the encoding and decoding processes.

Figure 18:
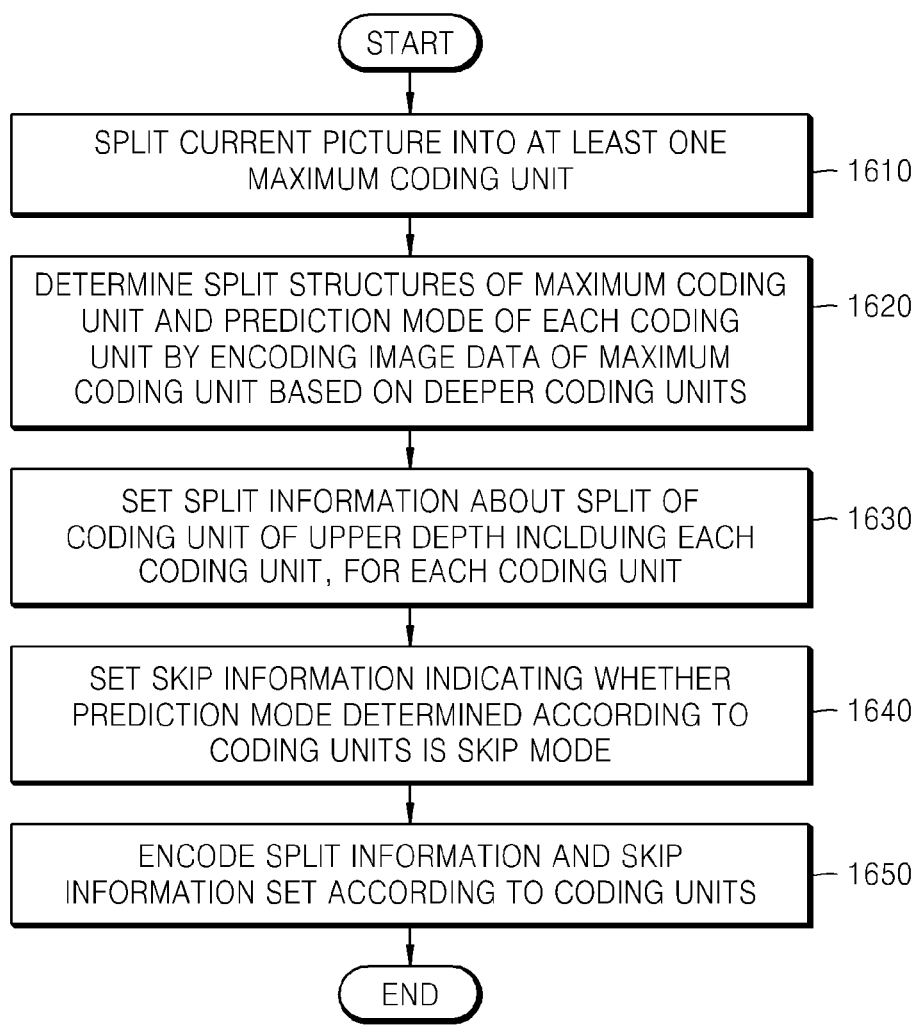
FIG. 18 is a flowchart illustrating a method of encoding an image, according to an exemplary embodiment.

FIG. 18 is a flowchart illustrating a method of encoding an image, according to an exemplary embodiment.

Referring to FIGS. 1 and 18, the maximum coding unit splitter 110 splits a current picture into a least one maximum coding unit, in operation 1610.

In operation 1620, the coded depth determiner 120 determines the split structures of the maximum coding unit and the prediction mode of each coding unit by encoding the image data of the maximum coding unit based on the coding units hierarchically split as depth deepens. As described above, the coded depth determiner 120 determines the coded depth by encoding the image data based on the coding units according to depths for the maximum coding unit of the current picture, and selecting the depth having the least encoding error. In detail, the coded depth determiner 120 encodes the image data in the maximum coding unit based on the deeper coding units corresponding to at least one depth equal to or below the maximum depth, and compares results of encoding the image data based on each of the deeper coding units to select a depth having the least encoding error. Also, even if coding units correspond to same depth in one maximum coding unit, the coded depth determiner 120 determines a split of each of the coding units corresponding to the same depth to a lower depth by measuring an encoding error of the image data of each coding unit, separately.

In operation 1630, the encoding information coding unit 140 sets split information about a split of a coding unit of an upper depth including each coding unit, for each coding unit. A process of setting the split information will be described below with reference to FIGS. 14 through 16.

In operation 1640, the encoding information coding unit 140 sets skip information indicating whether a prediction mode determined according to coding units is a skip mode. In operation 1650, the split information and skip information set according to coding units are encoded.

Figure 14:
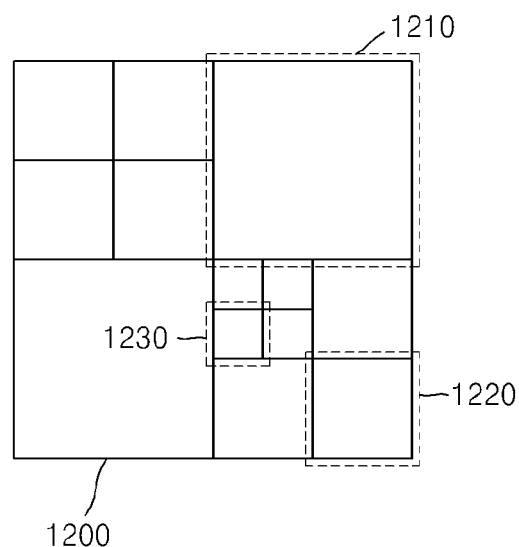
FIG. 14 is a diagram of split structures of a maximum coding unit determined based on deeper coding units, according to an exemplary embodiment.

FIG. 14 is a diagram of split structures of a maximum coding unit determined based on deeper coding units, according to an exemplary embodiment.

In FIG. 14, a largest block denoted by a reference numeral 1200 is the maximum coding unit, and it is assumed that the maximum coding unit 1200 has a maximum depth of 3. In other words, when a size of the maximum coding unit 1200 is 2N×2N, the maximum coding unit 1200 may split into a coding unit 1210 having a size of N×N and a depth of 1, coding units 1220 having a size of (N/2)×(N/2) and a depth of 2, and coding units 1230 having a size of (N/4)×(N/4) and a depth of 3. In order to transmit the split structures of maximum coding unit 1200 shown in FIG. 14, the encoding information coding unit 140 according to an exemplary embodiment sets the split information indicating split of the coding unit of upper depth including each coding unit, for each coding unit. For example, the coding unit 1210 having the size of N×N and the depth of 1 includes split information of 1 bit indicating split of an upper coding unit, i.e., the maximum coding unit 1200 having a depth of 0. If a coding unit of corresponding depth is split when each bit of split information has a value of "1", and a coding unit of corresponding depth is not split when each bit of split information has a value of "0", the coding unit 1210 having the depth of 1 has split information having a value of "1" to have the split structures shown in FIG. 14.

Figure 15:
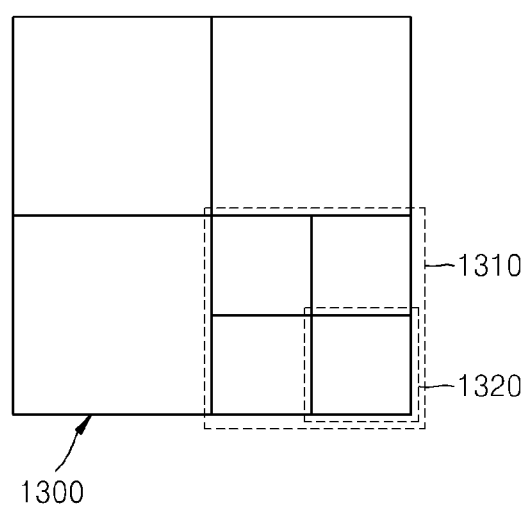
FIG. 15 is a diagram for describing split information of a coding unit of FIG. 14 having a depth of 2.

FIG. 15 is a diagram for describing split information of the coding unit 1220 of FIG. 14 having a depth of 2. A reference numeral 1320 of FIG. 15 corresponds to the coding unit 1220 having the depth of 2 in FIG. 14.

Referring to FIG. 15, the encoding information coding unit 140 sets split information of 2 bits indicating a split of a coding unit 1310 having a depth of 1 including the coding unit 1320 having a depth of 2, and split of the maximum coding unit 1300 having a depth of 0, as split information of the coding unit 1320 having the depth of 2. If a coding unit of corresponding depth is split when each bit of split information has a value of "1", and a coding unit of corresponding depth is not split when each bit of split information has a value of "0", the coding unit 1320 has the split information of 2 bits having a value of "11" since the coding unit 1320 is generated when both of the coding unit 1310 and the maximum coding unit 1300 are split.

Figure 16:
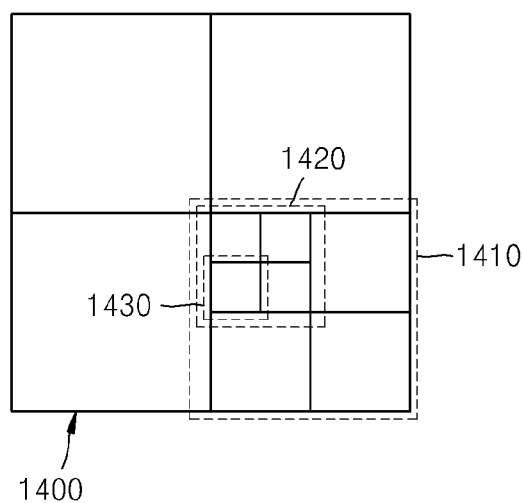
FIG. 16 is a diagram for describing split information of a coding unit of FIG. 14 having a depth of 3.

FIG. 16 is a diagram for describing split information of the coding unit 1230 of FIG. 14 having a depth of 3. A reference numeral 1430 of FIG. 16 corresponds to the coding unit 1230 of FIG. 14 having the depth of 3.

Referring to FIG. 16, the encoding information coding unit 140 includes split information of 3 bits indicating spilt of a coding unit 1420 having a depth of 2 and including the coding unit 1430 having the depth of 3, a split of a coding unit 1410 having a depth of 1, and split of a maximum coding unit 1400, as split information of the coding unit 1430 having the depth of 3. If a coding unit of corresponding depth is split when each bit of split information has a value of "1", and a coding unit of corresponding depth is not split when each bit of split information has a value of "0", the coding unit 1430 has the split information of 3 bits having a value of "111" since the coding unit 1430 is generated when all of the coding unit 1420, the coding unit 1410, and the maximum coding unit 1400 are split.

As such, when d denotes a maximum depth indicating a number of hierarchical splits of a height and width of a current coding unit from a maximum coding unit to a minimum coding unit and n denotes a depth of the current coding unit, wherein d and n are respectively an integer and $0 \leq n \leq (d-1)$, a split of a coding unit of an upper depth including the current coding unit may be set by using split information of n bits. Each bit of the split information of n bits is set to indicate split of coding units having depth upper than the current coding unit, from a depth of 0 to a depth of (n−1). Here, an order of the split information of n bits indicating split of coding units having upper depths from a most significant bit (MSB) or from a least significant bit (LSB) may vary as occasion commands.

Figure 17:
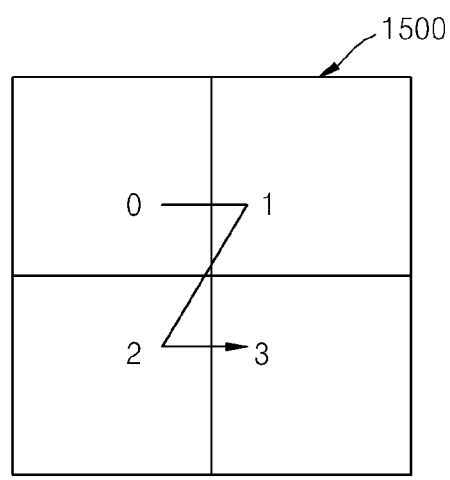
FIG. 17 is a diagram for describing a processing order of coding units, according to an exemplary embodiment.

Meanwhile, if the split information indicating split of the coding unit of the upper depth including the current coding unit is set for each coding unit, a location of each coding unit in the maximum coding unit may be easily determined based on the split information when the coding units are processed in the same processing order by an encoder and a decoder. For example, as shown in FIG. 17, when coding units having the same depth in a maximum coding unit 1500 according to an exemplary embodiment are processed in a zigzag scan order, and decoding units having the same depth are processed in the same zigzag scan order during decoding, it is possible to restore spilt structures of the maximum coding unit 1500 determined during encoding from split information indicating split of coding units of upper depths including each coding unit. A block processing order according to an exemplary embodiment may be variously set including the zigzag scan order, but processing orders of coding units may be identical during encoding and decoding so as to determine split structures of a maximum coding unit during the decoding.

The encoding information coding unit 140 sets skip information indicating whether a prediction mode of each coding unit is a skip mode, by assigning 1 bit to each coding unit. For example, the prediction mode of the corresponding coding unit is a skip mode when a bit of skip information has a value of "1", and the corresponding coding unit is predicted according to a prediction mode other than a skip mode when the bit of skip information has a value of "0". The skip information is set for each coding unit because a coding unit in a skip mode is restored from motion information of adjacent coding units without a separate prediction process and a separate split process is not performed on the coding unit in the skip mode during decoding, thereby improving compression efficiency and processing performance of an image.

Figure 19:
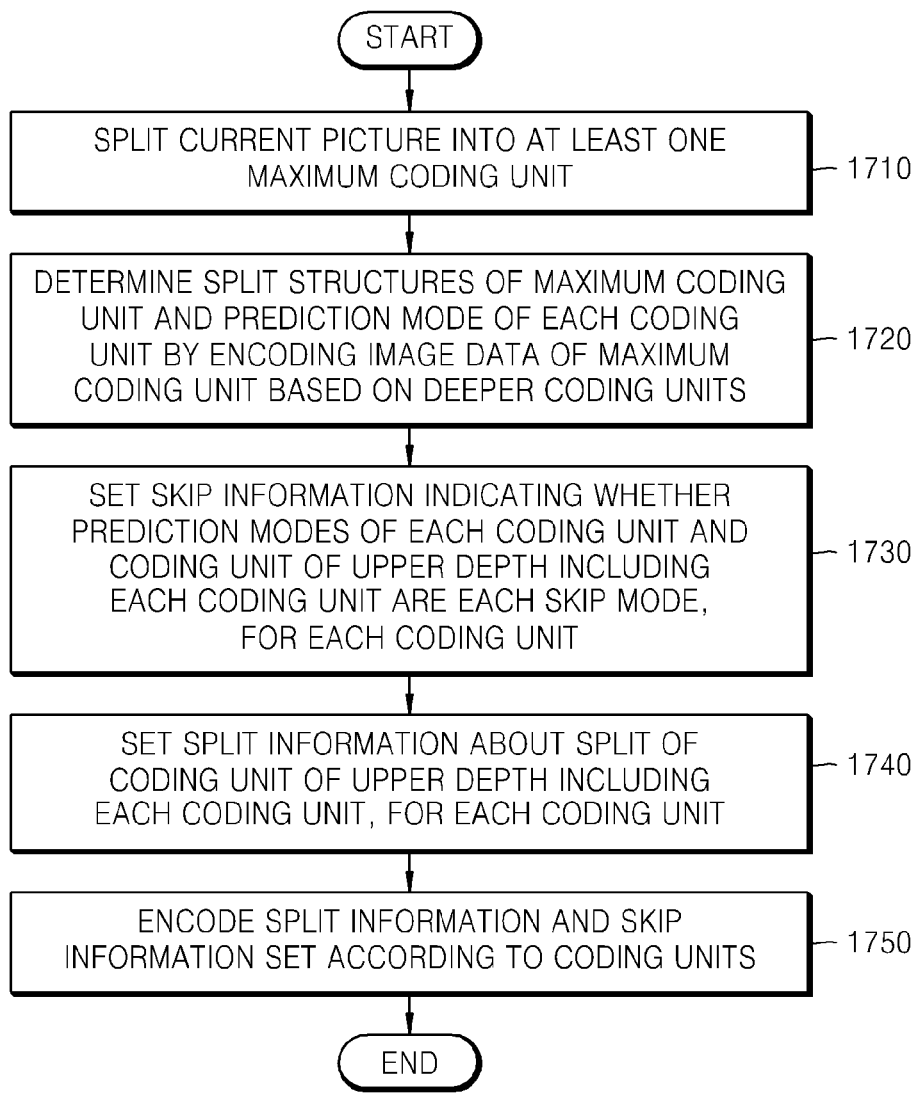
FIG. 19 is a flowchart illustrating a method of encoding an image, according to another exemplary embodiment.

FIG. 19 is a flowchart illustrating a method of encoding an image, according to another exemplary embodiment.

Referring to FIG. 19, the maximum coding unit splitter 110 splits a current picture into a least one maximum coding unit, in operation 1710.

In operation 1720, the coded depth determiner 120 determines the split structures of the maximum coding unit and the prediction mode of each coding unit by encoding the image data of the maximum coding unit based on the deeper coding units hierarchically split as depth deepens. As described above, the coded depth determiner 120 determines the coded depth by encoding the image data in the deeper coding units according to depths, according to the maximum coding unit of the current picture, and selecting the depth having the least encoding error.

In operation 1730, the encoding information coding unit 140 sets skip information indicating whether prediction modes of each coding unit and a coding unit of upper depth including each coding unit are each a skip mode, for each coding unit. In other words, according to another exemplary embodiment, the skip information of each coding unit may include not only a skip mode of a current coding unit, but also a skip mode of a coding unit of an upper depth including the current coding unit. In detail, when d denotes a maximum depth indicating a number of hierarchical splits of a height and width of a current coding unit from a maximum coding unit to a minimum coding unit and n denotes a depth of the current coding unit, wherein d and n are respectively an integer and $0 \leq n \leq (d-1)$, the encoding information coding unit 140 may set split information of n bits indicating whether prediction modes of the current coding unit and (n−1) coding units of upper depths are each a skip mode. When n=1, i.e., when the current coding unit has a depth of 1, a coding unit having an immediately upper depth is a maximum coding unit, and thus only skip information of 1 bit indicating whether the prediction mode of the current coding unit is a skip mode is set. For example, the coding unit 1210 of FIG. 14 having the depth of 1 has skip information of 1 bit indicating whether its prediction mode is a skip mode.

Alternatively, referring to FIG. 15, the encoding information unit 140 sets skip information of total 2 bits, wherein 1 bit indicates skip information of the coding unit 1320 having a depth of 2 and 1 bit indicates skip information of the coding unit 1310 having the depth of 1 and including the coding unit 1320, as the skip information of the coding unit 1320. Alternatively, referring to FIG. 16, the encoding information coding unit 140 may set skip information of total 3 bits, which includes skip information of the coding unit 1430 having a depth of 3, skip information of the coding unit 1420 having the depth of 2 and including the coding unit 1430, and skip information of the coding unit 1410 having a depth of 1, as the skip information of the coding unit 1430.

Referring back to FIG. 19, split information about a split of a coding unit of an upper depth including each coding unit is set for each coding unit, in operation 1740. Since setting of split information in operation 1740 is identical to the setting described above, details thereof are not repeated.

In operation 1750, the split information and skip information, which are set according to coding units, are encoded.

Figure 20:
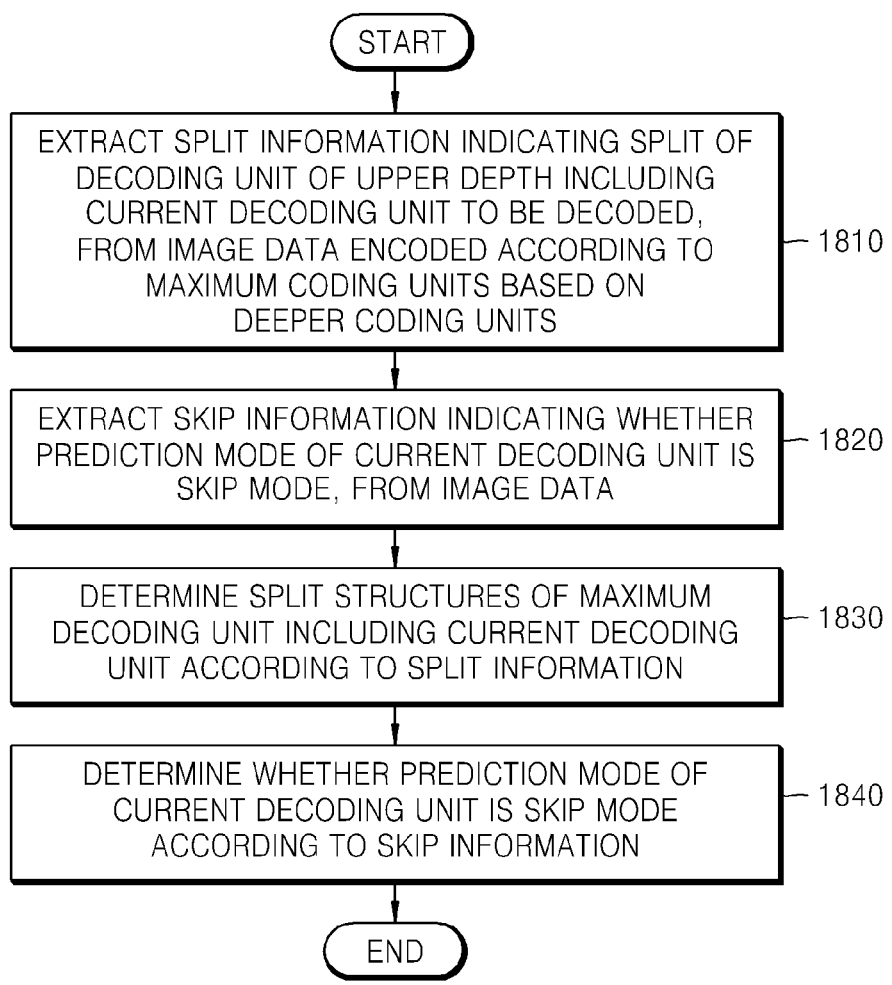
FIG. 20 is a flowchart illustrating a method of decoding an image, according to an exemplary embodiment.

FIG. 20 is a flowchart illustrating a method of decoding an image, according to an exemplary embodiment. The method according to the current embodiment decodes a bitstream encoded according to the method of FIG. 18.

Referring to FIGS. 2 and 20, the encoding information extractor 220 extracts split information indicating split of a decoding unit of an upper depth including a current decoding unit to be decoded, from image data encoded according to maximum coding units based on deeper coding units according to depths, which are hierarchically split as a depth deepens, in operation 1810.

In operation 1820, the encoding information extractor 220 extracts skip information indicating whether a prediction mode of the current decoding unit is a skip mode, from the image data.

In operation 1830, the image data decoding unit 230 determines split structures of a maximum decoding unit including the current decoding unit, according to the split information. As described above, since the split information is in n bits indicating split of the decoding unit of upper depth including the current decoding unit, the maximum decoding unit may be split to a coding unit having a depth of the current decoding unit by using the split information.

In operation 1840, the image data decoding unit 230 determines whether the prediction mode of the current decoding unit is a skip mode, according to the skip information. If the current decoding unit is in the skip mode, a split process is stopped and other information included in encoding information is decoded.

Figure 21:
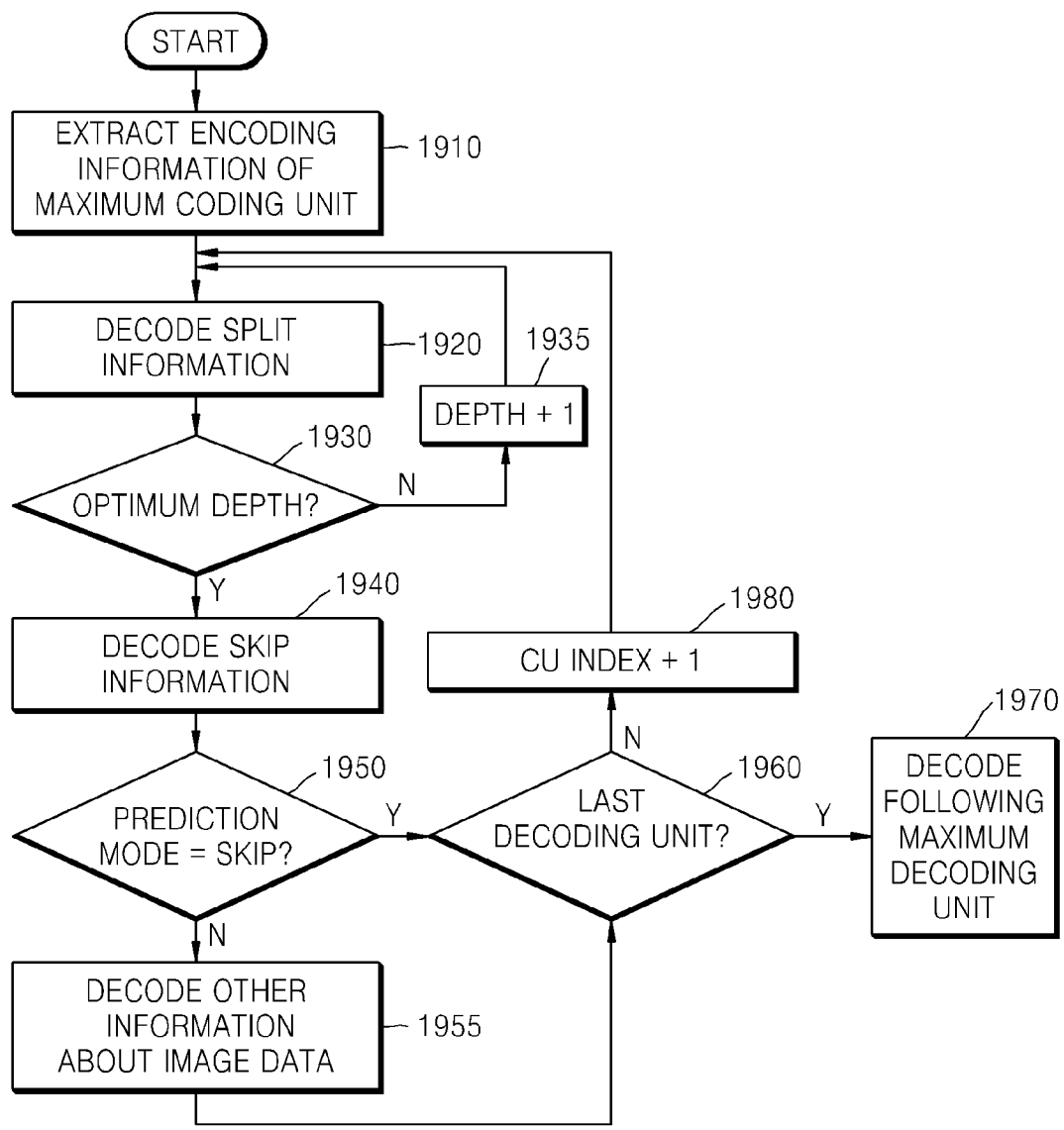
FIG. 21 is a flowchart illustrating a process of splitting a maximum decoding unit and a process of decoding skip information, according to a method of decoding an image, according to an exemplary embodiment.

FIG. 21 is a flowchart illustrating a process of splitting a maximum decoding unit and a process of decoding skip information, according to a method of decoding an image, according to an exemplary embodiment.

Referring to FIG. 21, encoding information of coding units included in a maximum coding unit is extracted in operation 1910. As described above, the encoding information includes split information and skip information.

The split information is decoded in operation 1920, and it is determined whether a maximum decoding unit is split according to a depth set based on the decoded split information to a current decoding unit having the depth, in operation 1930. For example, as described above, if the current decoding unit is a decoding unit having a depth of 2 and split information of "11", the current decoding unit should be included in coding units obtained by splitting the maximum decoding unit twice.

If it is determined that the maximum decoding unit is not split up to the depth of the current decoding unit in operation 1930, a depth is increased by one in operation 1935.

If it is determined that the maximum decoding unit is split up to the depth of the current decoding unit in operation 1930, the skip information is decoded in operation 1940. It is determined whether a prediction mode of the current decoding unit is a skip mode in operation 1950, and if it is the skip mode, it is determined whether the current decoding unit is the last decoding unit 1960 to decode a following maximum decoding unit in operation 1970 or to decode a following decoding unit by increasing an index value of a decoding unit by 1 in operation 1980.

If it is determined that the prediction mode of the current decoding unit is not the skip mode in operation 1950, information about the image data other than the split and skip information is decoded in operation 1955.

Figure 22:
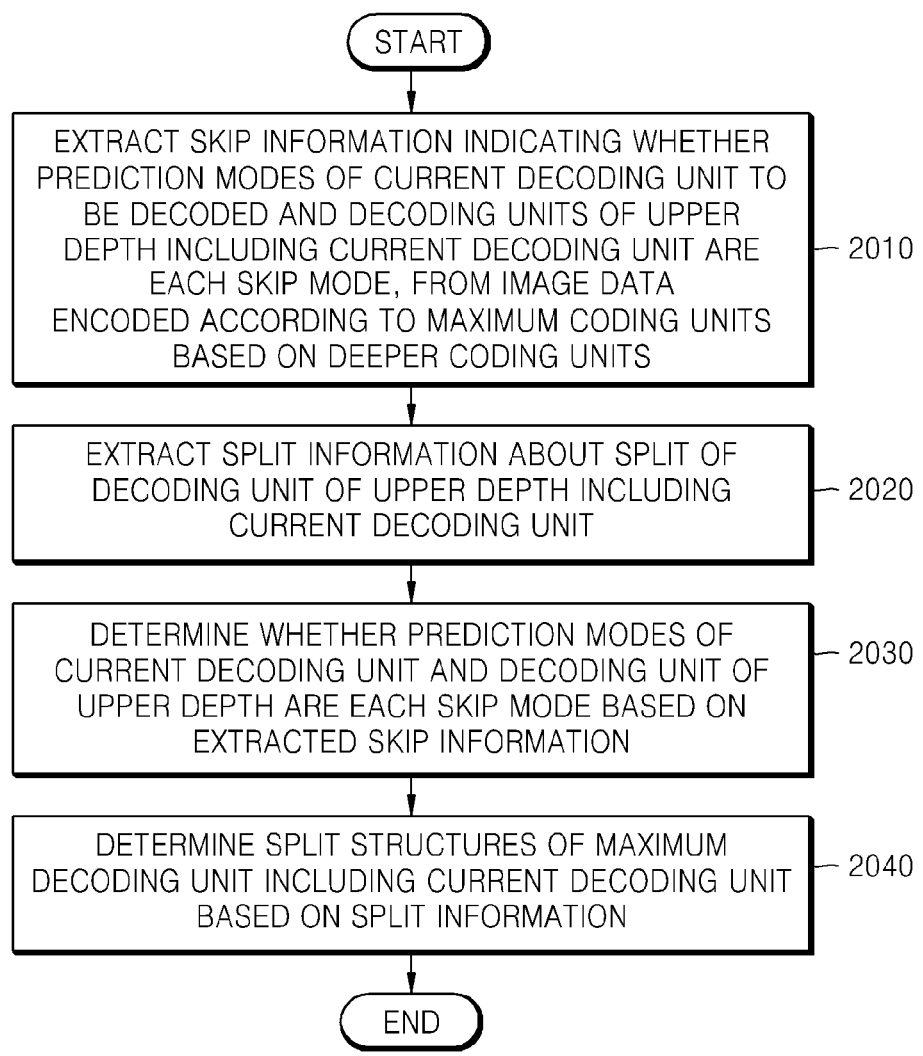
FIG. 22 is a flowchart illustrating a method of decoding an image, according to another exemplary embodiment.

FIG. 22 is a flowchart illustrating a method of decoding an image, according to another exemplary embodiment. The method according to the current embodiment decodes a bitstream encoded according to the method of FIG. 19.

Referring to FIGS. 2 and 22, the encoding information extractor 220 extracts skip information indicating whether prediction modes of a current decoding unit to be decoded and decoding units of upper depths including the current decoding unit are each a skip mode, from image data encoded according to maximum coding units based on deeper coding units according to depths, which are hierarchically split as a depth deepens, in operation 2010.

In operation 2020, the encoding information extractor 220 extracts split information about a split of the decoding unit of upper depth including the current decoding unit, from the image data.

In operation 2030, the image data decoding unit 230 determines whether the prediction modes of the current decoding unit and the decoding unit of upper depths are each a skip mode, based on the extracted skip information. As such, according to the current embodiment, when the skip information is decoded before decoding the split information, processing performance of an image may be improved since a decoding unit that is determined to be in a skip mode may not split.

In operation 2040, split structures of a maximum decoding unit including the current decoding unit are determined based on the split information with respect to the decoding unit that is not in a skip mode.

FIG. 23 is a flowchart illustrating a process of splitting a maximum decoding unit and a process of decoding skip information, according to a method of decoding an image, according to another exemplary embodiment.

Referring to FIG. 23, encoding information of coding units included in a maximum coding unit is extracted in operation 2110. As described above, the encoding information includes split information and skip information.

The skip information is decoded in operation 2120, and it is determined whether a prediction mode of a current decoding unit is a skip mode according to the decoded skip information in operation 2130. If the prediction mode of the current decoding unit is a skip mode, it is determined whether the current decoding unit is the last decoding unit in operation 2135. If it is the last decoding unit, a following maximum decoding unit is decoded in operation 2140, and if it is not the last decoding unit, a following decoding unit is decoded by increasing an index of a decoding unit by one in operation 2145. If the prediction mode of the current decoding unit is not a skip mode, the split information of the current decoding unit is decoded in operation 2150.

It is determined whether a maximum decoding unit is split according to a depth set based on the decoded split information to a current decoding unit having the depth, in operation 2160. For example, as described above, if the current decoding unit is a decoding unit having a depth of 2 and split information of "11", the current decoding unit should be a coding unit obtained by splitting the maximum decoding unit twice.

If it is determined that the maximum decoding unit is not split up to the depth of the current decoding unit in operation 2160, a depth is increased by one in operation 2180, and if it is determined that the maximum decoding unit is split up to the depth of the current decoding unit in operation 2160, information about the image data other than the split and skip information is decoded in operation 2170.

According to the exemplary embodiments, methods and apparatuses for encoding and decoding an image, which efficiently transmit information about split structures of an image encoded based on a hierarchical coding unit in various sizes, and information about a skip mode of each coding unit may be provided.

The exemplary embodiments may also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the inventive concept has been particularly shown and described with reference to exemplary embodiments thereof, it will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the inventive concept is defined not by the detailed description of the exemplary embodiments but by the following claims.

What is claimed is:

1. A method of decoding an image, the method comprising:
   extracting split information indicating whether to split a coding unit of an upper depth into coding units of deeper depths, from a bitstream;
   determining a split structure of a maximum coding unit, according to the split information;
   extracting skip information indicating whether a prediction mode of a current coding unit is a skip mode, from the bitstream;
   when the skip information indicates that the prediction mode of the current coding unit is the skip mode, determining the current coding unit as one prediction unit of which prediction mode is the skip mode; and when the skip information indicates that the prediction mode of the current coding unit is not the skip mode, obtaining one or more prediction units from the current coding unit, wherein the determining the split structure of the maximum coding unit comprises:

when the split information indicates a split of a coding unit of a current depth, obtaining four coding units of deeper depth by splitting the coding unit of the current depth.

* * * * *